C. F. ACKERMAN.
FAUCET COUPLING.
APPLICATION FILED JAN. 27, 1909.

964,731.

Patented July 19, 1910.

ATTEST
E. M. Fisher
F. C. Mussun

INVENTOR
Charles F. Ackerman
By Fisher & Moser Attys.

UNITED STATES PATENT OFFICE.

CHARLES F. ACKERMAN, OF CLEVELAND, OHIO.

FAUCET-COUPLING.

964,731.     Specification of Letters Patent.     Patented July 19, 1910.

Application filed January 27, 1909. Serial No. 474,431.

*To all whom it may concern:*

Be it known that I, CHARLES F. ACKERMAN, citizen of the United States, residing at Cleveland, in the county of Cuyahoga and State of Ohio, have invented certain new and useful Improvements in Faucet-Couplings, of which the following is a specification.

My invention relates to a new and original faucet coupling for small hose or tubes employed in connection with syringes, bath sprays and the like, and which is especially adapted to be used where there is no screw thread to make the desired connection, all substantially as shown and described and particularly pointed out in the claim.

Figure 1:
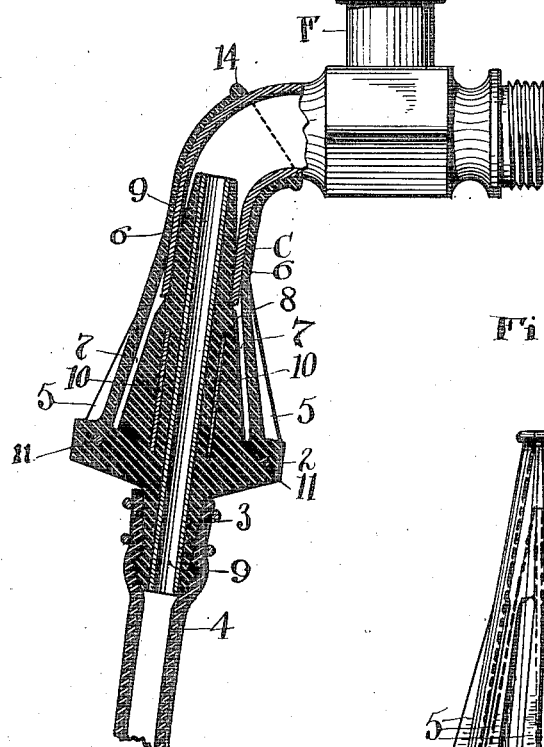
Figure 2:
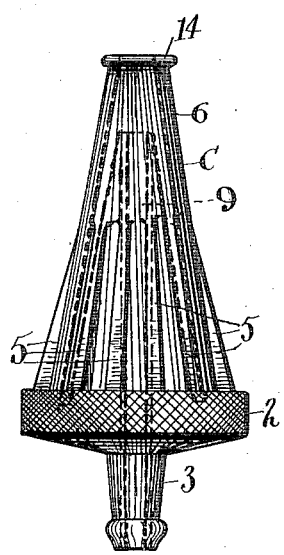

In the accompanying drawings, Figure 1 shows a side elevation of a faucet and a sectional elevation of the coupling member attached thereto, and Fig. 2 is a side elevation of the coupling member alone.

F represents a common form of faucet as found very generally in connection with wash basins and the like and which in itself represents no present novelty but serves to illustrate the use and relation of coupling C therewith. Said coupling, so-called, is a new article of manufacture complete in itself, and is adapted as above indicated to make what may be termed a combined slip and cork connection with and closure upon the faucet. To these ends the said coupling is fashioned as to shape or contour about as shown, being approximately conical or conoidal in shape and provided with a solid base portion 2 and a nipple 3 centrally thereon adapted to attach hose 4. From said base to the opposite extremity the exterior taper runs in substantially straight lines with a series of ribs 5 thereon, deepest at said base and tapering to about the middle of the coupling where they run out, in this instance. These ribs serve the double purpose of giving strength to otherwise rather thin outer or sleeve portion 6 of the coupling and of a grip for the hand in pressing the coupling into place, a rotary movement thereof being helpful while the direct pressure is being applied to crowd it into correct engaging position, relatively as seen in Fig. 1. The said sleeve 6 has substantially the same thickness throughout and starts in head 2. Inside thereof and separated therefrom all around by space 7 is the stopper portion 8 of the coupling. This part or portion is tapered to correspond in the main to the taper of the outside of the coupling, so that the annular space 7 between sleeve 6 and stopper 8 tapers from the base out in proportions agreeing with both the external and the internal tapers of said parts. Furthermore a fluid passage runs centrally through the coupling and its nipple 3, and in order that said passage may be protected and not contracted when the device is used I provide the same with a tube 9, which extends the full length thereof internally including nipple 3, but in this connection it will be observed that sleeve 6 is of greater length than the stopper and adapted to stretch over the neck of the faucet and engage thereon relatively as shown. This of course implies that sleeve 6 is elastic, as it is, and the entire device partakes of this elasticity more or less, but I prefer to have the base and the stopper 6 harder than the sleeve, and if the stopper was hard or firm enough to enter the faucet and perfectly seal itself therein without compressing or contracting the internal fluid passage objectionably the tube 9 would not be needed. But with the said tube as a precautionary and stiffening part an otherwise flexible and compressible core or stopper 8 can be used and perfect closure of the faucet and effectual engagement of the stopper therein be secured. Compression of the core or stopper also adapts it to different sizes of faucet. Now, it may be further observed in this connection, that the stopper has to hold its place as against the water pressure in the faucet, which sometimes is very heavy, and hence to prevent blowing off of the coupling I find auxiliary means of fastening necessary. This is supplied in or by sleeve 6, which is adapted to be drawn over the faucet more or less as a given connection may require and can even be doubled back upon itself, if necessary, in drawing the coupling relatively farther on or into the faucet than shown herein. In any case the sleeve is stretched and thus caused to grip firmly upon the surface of the faucet, and with stopper 8 is found to be sufficient to hold the coupling in place under any city or other local pressure. Cloth reinforcement 10 and wire 11 may be employed if preferred.

In the manufacture the entire article is molded in one piece and portions thereof may be subsequently treated separately according to the quality wanted in each.

A bead 14 is formed on or about the extremity of the sleeve which is large enough to grip with the thumb and finger to draw the sleeve over the faucet.

If the core or stopper were fairly hard or so as not to compress as shown I should rely upon its taper alone to adapt it to different sizes of faucets. As to the sleeve I may add that while I prefer that it should have proportionate length as shown the matter of length itself is not of first importance but the grip of the sleeve on the faucet to help hold the cork in place.

What I claim is:—

A coupling member having a base provided with a nipple 3 at its bottom and a cone shaped core 8 at its top and a passage extending centrally through the same and the extremity of said core tapered to a thin edge, and a flexible substantially cone shaped sleeve about said core and uniformly spaced therefrom the full depth of the core and extending beyond the extremity thereof approximately one-third the length of said core and having strengthening ribs lengthwise in its base, and a rigid pipe occupying said passage and flush at its ends with the end of said core and of the said nipple respectively, whereby a coupling member is formed which is adapted to various sizes of faucets and adapted to engage upon either smooth or threaded fittings and the core is pinched between a fitting and the pipe in the coupling.

In testimony whereof I affix my signature in presence of two witnesses.

CHARLES F. ACKERMAN.

Witnesses:
 E. M. FISHER,
 F. C. MUSSUN.